(12) United States Patent
Planegger et al.

(10) Patent No.: US 12,224,577 B2
(45) Date of Patent: Feb. 11, 2025

(54) APPARATUS FOR ELECTRICAL PROTECTION

(71) Applicant: KONINKLIJKE PHILIPS N.V., Eindhoven (NL)

(72) Inventors: Walter Alex Planegger, Eindhoven (NL); Robi Rek, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 17/783,135

(22) PCT Filed: Nov. 25, 2020

(86) PCT No.: PCT/EP2020/083268
§ 371 (c)(1),
(2) Date: Jun. 7, 2022

(87) PCT Pub. No.: WO2021/110496
PCT Pub. Date: Jun. 10, 2021

(65) Prior Publication Data
US 2023/0352929 A1    Nov. 2, 2023

(30) Foreign Application Priority Data
Dec. 3, 2019   (EP) ..................... 19213245

(51) Int. Cl.
*H02H 7/085* (2006.01)
(52) U.S. Cl.
CPC ................. *H02H 7/0851* (2013.01)
(58) Field of Classification Search
CPC .................................... H02H 7/0851
USPC ........................................... 361/31
See application file for complete search history.

(56) References Cited

U.S. PATENT DOCUMENTS

| | | | |
|---|---|---|---|
| 3,638,157 A | 1/1972 | Kruzic | |
| 6,710,988 B1 | 3/2004 | Yee et al. | |
| 2016/0086757 A1* | 3/2016 | Xu | H01C 3/20 337/183 |

(Continued)

FOREIGN PATENT DOCUMENTS

| | | |
|---|---|---|
| CN | 201616794 U | 10/2010 |
| JP | 2003051232 A | 2/2003 |

(Continued)

*Primary Examiner* — Kawing Chan
(74) *Attorney, Agent, or Firm* — Schott, P.C.

(57) ABSTRACT

An apparatus for providing electrical protection at a device including a motor unit, is described. The apparatus includes a first fuse having a first breaking capacity, a first set of time-current characteristics, and a first rating; and a second fuse having a second breaking capacity, a second set of time-current characteristics, and a second rating. The second set of time-current characteristics is different from the first set of time-current characteristics and the second rating is different from the first rating. The first fuse and the second fuse are connected in series, a value of the first breaking capacity is set such that at a high current fault condition, the first fuse acts to interrupt a current before the second fuse. Further, a value of the second set of time-current characteristics is set such that at a locked rotor condition of the motor unit, the second fuse acts to interrupt a current before the motor unit reaches a maximum winding temperature.

7 Claims, 5 Drawing Sheets

(56) References Cited

U.S. PATENT DOCUMENTS

2018/0062546 A1* 3/2018 Xiang ..................... H02P 3/02

FOREIGN PATENT DOCUMENTS

| JP | 2010129351 A | | 6/2010 | |
|---|---|---|---|---|
| JP | 2020171141 A | * | 10/2020 | |
| WO | WO-2017042321 A1 | * | 3/2017 | ........... H01H 39/006 |

* cited by examiner

APPARATUS FOR ELECTRICAL PROTECTION

CROSS-REFERENCE TO RELATED APPLICATIONS

The present application is a U.S. National Phase application under 35 U.S.C. § 371 of International Application No. PCT/EP2020/083268, filed on Nov. 25, 2020, which claims the benefit of European Patent Application No. 19213245.4, filed on Dec. 3, 2019. These applications are hereby incorporated by reference herein.

FIELD OF THE INVENTION

The present disclosure relates to an apparatus for providing electrical protection. In particular, the present disclosure relates to an apparatus for providing electrical protection at a device which comprises one or more motor units.

BACKGROUND OF THE INVENTION

An electric motor of an electrical household appliance, for example a hand-blender, a chopper, or a juicer, operates as an energy transducer which converts electrical energy into mechanical energy. For some of these household appliances the electric could be blocked during operation, for example the component(s) of a hand-blender could be blocked due to high viscosity of the blended food and/or solid particles in the food and/or misuse. The blocked component(s) would cause the driving electric motor to be blocked.

According to safety regulations, the maximum winding temperature must not be exceeded when the rotor is blocked. For hand-held appliances, appliances that have to be kept switched on by hand or foot, and appliances that are continuously loaded by hand, the safety standard can be met either by using a motor which can be locked for 30 seconds without exceeding the allowed winding temperature or switch it off before exceeding the allowed winding temperature.

SUMMARY OF THE INVENTION

As mentioned above, one of the ways to address the problem of overheating at electric motors is to use electric motors that are constructed to be locked for 30 seconds without exceeding the maximum winding temperature. However, this technique required a certain mass of magnetic wire material as well as motor/stator material for winding and rotor lamination. In addition, a melting fuse is also required to cut off electricity at high current fault conditions (e.g. rectifier short circuit). Another way to address this problem is to use a cut-off element which can act to cut off current to the locked rotor at the electric motor before the maximum winding temperature is reached. This approach includes a temperature cut off (TCO) resistor or a positive temperature coefficient (PTC) resistant resistor to cut off current to the locked rotor and a melting fuse to cut off electricity at high current fault conditions (e.g. rectifier short circuit). Yet another way to address this problem is to only use a melting fuse to cut off electricity to the locked rotor. However, the characteristics of the melting fuse in this scenario is usually not capable of cutting off high current fault conditions (e.g. rectifier short circuit) reliably due to low breaking capacity.

As noted above, currently available solutions requires remarkable effort (as well as costs) to fulfill the requirements of the safety standard. It would therefore be advantageous to use low cost components for preventing locked rotor overheating at a device comprising a motor unit.

To better address one or more of the concerns mentioned earlier, in a first aspect, an apparatus for providing electrical protection at a device comprising a motor unit. The apparatus comprising: a first fuse connected to the motor unit, the first fuse having a first breaking capacity, a first set of time-current characteristics, and a first rating; a second fuse connected to the first fuse and the motor unit, the second fuse having a second breaking capacity, a second set of time-current characteristics, and a second rating, wherein the second set of time-current characteristics is different from the first set of time-current characteristics and the second rating is different from the first rating, wherein the first fuse and the second fuse are connected in series, wherein the value of the first breaking capacity of the first fuse is set such that at a high current fault condition the first fuse acts to interrupt the current before the second fuse, and wherein the value of the second set of time-current characteristics of the second fuse is set such that at a locked rotor condition of the motor unit the second fuse acts to interrupt the current before the motor unit reaches a maximum winding temperature.

In some embodiments, the second rating may be lower than the first rating.

In some embodiments, the second breaking capacity may be lower than the first breaking capacity.

In some embodiments, the first breaking capacity may be in the range between 1200 A and 1800 A, and the second breaking capacity may be in the range between 25 A to 45 A.

In some embodiments, the apparatus may further comprise a switch or an electronic control circuit arranged between the first fuse and the second fuse.

In some embodiments, the apparatus may further comprise a rectifier unit connected to the motor unit, the rectifier unit being configured to provide rectified voltage to the motor unit.

In some embodiments, there is provided a device comprising the apparatus as described herein, the device further comprising the motor unit. The device may be one of: an electric blender, an electric chopper, an electric juicer, and an electric food processor.

According to the aspects and embodiments described above, the limitations of existing techniques are addressed. In particular, the above-described aspects and embodiments enable motor fault scenarios including locked rotor conditions and high current fault conditions to be addressed effectively by an apparatus including a fuse arrangement. The embodiments described above offer a low-cost and effectual way to provide electrical protection for appliances equipped with motor-driven components.

There is thus provided an improved apparatus for providing electrical protection at a device comprising a motor unit. These and other aspects of the disclosure will be apparent from and elucidated with reference to the embodiment(s) described hereinafter.

BRIEF DESCRIPTION OF THE DRAWINGS

For a better understanding of the embodiments, and to show more clearly how they may be carried into effect, reference will now be made, by way of example only, to the accompanying drawings, in which.

DETAILED DESCRIPTION OF EMBODIMENTS

As noted above, there is provided an improved apparatus which addresses the existing problems.

Figure 1:
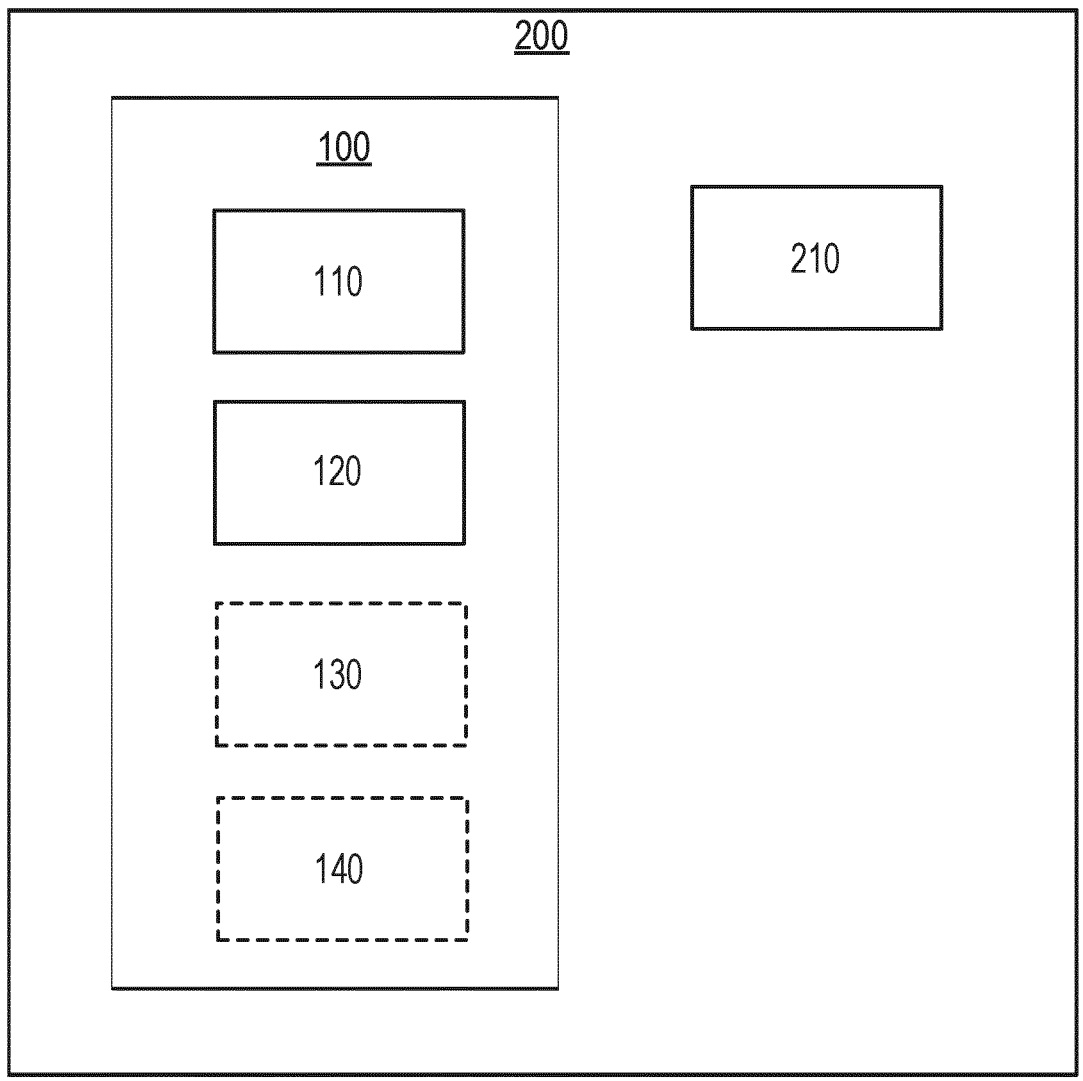
FIG. 1 is a block diagram of a device comprising an apparatus for providing electrical protection, according to an embodiment.

FIG. 1 shows a block diagram of a device 200 comprising an apparatus 100, according to an embodiment, the apparatus 100 being able to be used for providing electrical protection at the device 200. The apparatus 100 comprises a first fuse 110, a second fuse 120, a switch 130, and a rectifier unit 140. The device 200 comprises a motor unit 210. The device 200 may be an electric blender, an electric chopper, an electric juicer, or an electric food processor.

The first fuse 110 is connected to the motor unit 210 of the device 200. The first fuse 100 has a first breaking capacity, a first set of time-current characteristics, and a first rating. The second fuse 120 is connected to the first fuse 110 and the motor unit 210, and has a second breaking capacity, a second set of time-current characteristics, and a second rating. The second set of time-current characteristics of the second fuse 120 is different from the first set of time-current characteristics, and the second rating is different from the first rating. The first fuse 110 and the second fuse 120 are connected in series. In some embodiments, the second rating may be lower than the first rating. Also, in some embodiments, the second breaking capacity may be lower than the first breaking capacity. For example, the first breaking capacity of the first fuse 110 may be in the range between 1200 A and 1800 A, and the second breaking capacity may be between 25 A and 45 A.

The value of the first breaking capacity of the first fuse 110 is set such that at a high current fault condition the first fuse 110 acts to interrupt the current before the second fuse 120, or to interrupt the current if the second fuse 120 cannot interrupt the current permanently (e.g. if the current was above the breaking capacity of the second fuse). In some embodiments, the breaking capacity of the first fuse 110 (i.e. the first breaking capacity) may be in accordance with ICE Publication 60127, which is 1500 A, and the breaking capacity of the second fuse 120 (i.e. the second breaking capacity) may be in accordance with ICE Publication 60127, which is 25 A. The value of the second set of time-current characteristics is set such that at a locked rotor condition of the motor unit 210, the second fuse 120 acts to interrupt the current before the motor unit 210 reaches a maximum winding temperature.

The switch 130 is arranged between the first fuse 110 and the second fuse 130. Although in FIG. 1 the switch 130 is shown as a component of the apparatus 100, it will be appreciated in other embodiments the switch may be implemented as a component of the device 200 rather than a component of the apparatus 100. It will also be appreciated that in some embodiments the apparatus 100 or the device 200 may not comprise the switch 130.

The rectifier unit 140 is configured to provide rectified voltage to the motor unit 210 of the device 200. Although in FIG. 1 the rectifier unit 140 is shown as a component of the apparatus 100, it will be appreciated in other embodiments the rectifier unit 140 may be implemented as a component of the device 200 rather than a component of the apparatus 100. It will also be appreciated that in some embodiments the apparatus 100 or the device 200 may not comprise the rectifier unit 140.

It will be appreciated that FIG. 1 only shows the components required to illustrate an aspect of the apparatus 100 and the device 200 and, in a practical implementation, the apparatus 100 may comprise alternative or additional components to those shown. For example, in some embodiments the motor unit may be a component of the apparatus 100. For example, in some embodiments instead of a switch, the apparatus may comprise a control unit (e.g. an electronic control circuit) configured to control current flow in the circuit, the control unit being connected to the first fuse 110 and the second fuse 120. In particular, the control unit may be arranged between the first fuse 110 and the second fuse 120, or it may be arranged between the second fuse 120 and the motor unit 210 of the device 200. The control unit may also be implemented as a component of the device 200 instead of the apparatus 100.

Figure 2:
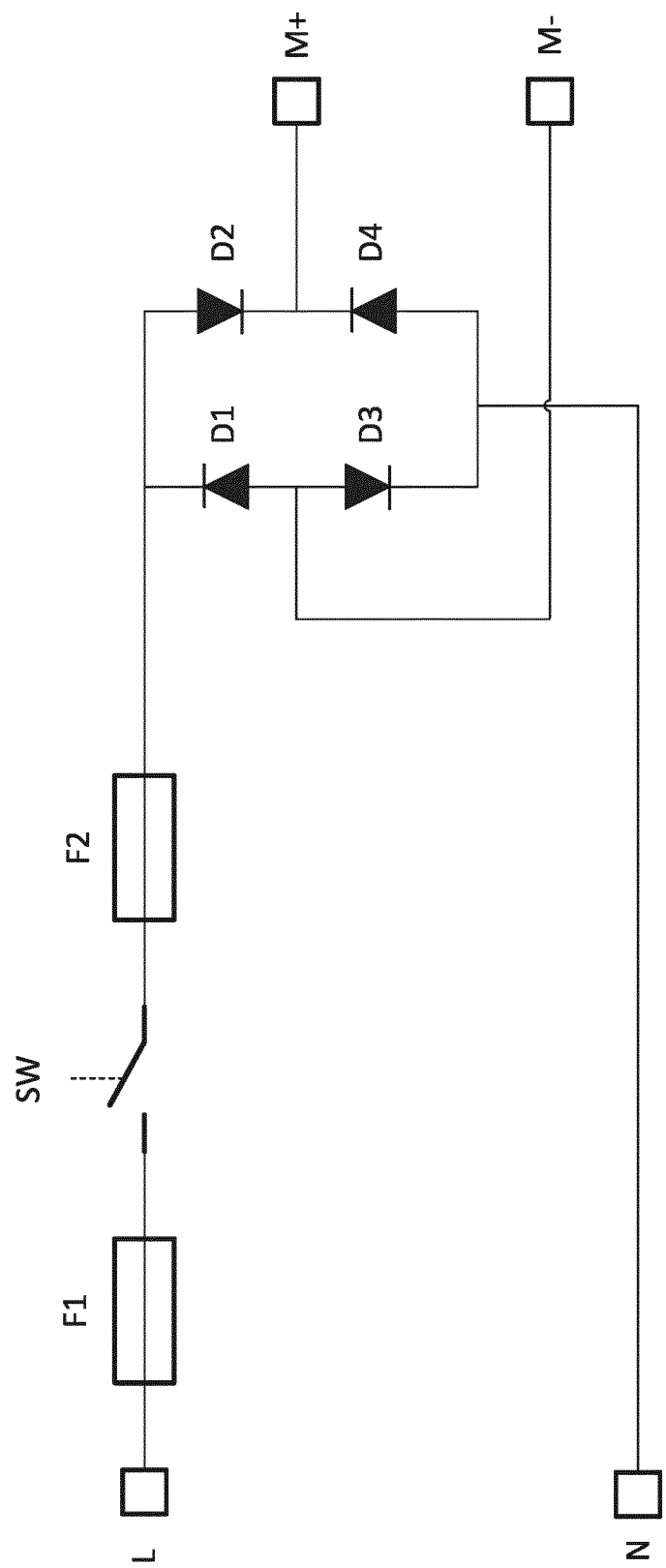
FIG. 2 is a circuit diagram of an apparatus for providing electrical protection, according to another embodiment.

FIG. 2 is a circuit diagram of an apparatus for providing electrical protection, according to another embodiment. The functionalities of the circuit represented by the diagram in FIG. 2 will be explained with reference to FIG. 3A and FIG. 3B, which respectively illustrate current flow in a locked rotor scenario at the apparatus of FIG. 2 and current flow in a rectifier unit short circuit scenario at the apparatus of FIG. 2.

As shown in FIG. 2, the apparatus in this embodiment comprises a first fuse F1, a second fuse F2, a switch SW, a plurality of rectifier diodes (first diode D1, second diode D2, third diode D3, fourth diode D4) forming a rectifier unit, terminals M+ and M- representing a motor unit, and terminals L and N representing power supply. In the present embodiment the motor unit (as represented by terminals M+ and M-) is a direct current (DC) motor unit. In both scenarios illustrated in FIG. 3A and FIG. 3B, the switch SW is closed to allow current flow.

Also as shown in FIG. 2, the first fuse F1, the second fuse F2, and the switch SW are connected in series. The first fuse F1 has a first breaking capacity, a first set of time-current characteristics, and a first rating. The second fuse F2 has a second breaking capacity, a second set of time-current characteristics, and a second rating. The second set of time-current characteristics is different from the first set of time-current characteristics, and the second rating is different from the first rating. In more detail, the value of the first breaking capacity is set such that a high current fault condition the first fuse F1 acts to interrupt the current before the second fuse F1, and the value of the second set of time-current characteristics is set such that at a locked rotor condition of the motor unit the second fuse F2 acts to interrupt the current before the motor unit reaches a maximum winding temperature. An example range of the first breaking capacity may be 1200-1800 A, and an example range of the second breaking capacity may be 25-45 A. For the purpose of illustration, the first fuse F1 in the present embodiment has a higher breaking capacity (first breaking capacity) than the second fuse F2 (second breaking capacity).

In this embodiment, the switch SW is arranged between the first fuse F1 and the second fuse F2 such that current can be interrupted manually by opening and closing the switch SW. The rectifier unit as represented by the plurality of diodes D1, D2, D3, D4 is configured to provide rectified voltage to the motor unit. As mentioned above with reference to FIG. 1, the switch SW and the rectifier unit may be optional and therefore in alternative embodiments these components may be absent from the circuit arrangement.

Figure 3A:
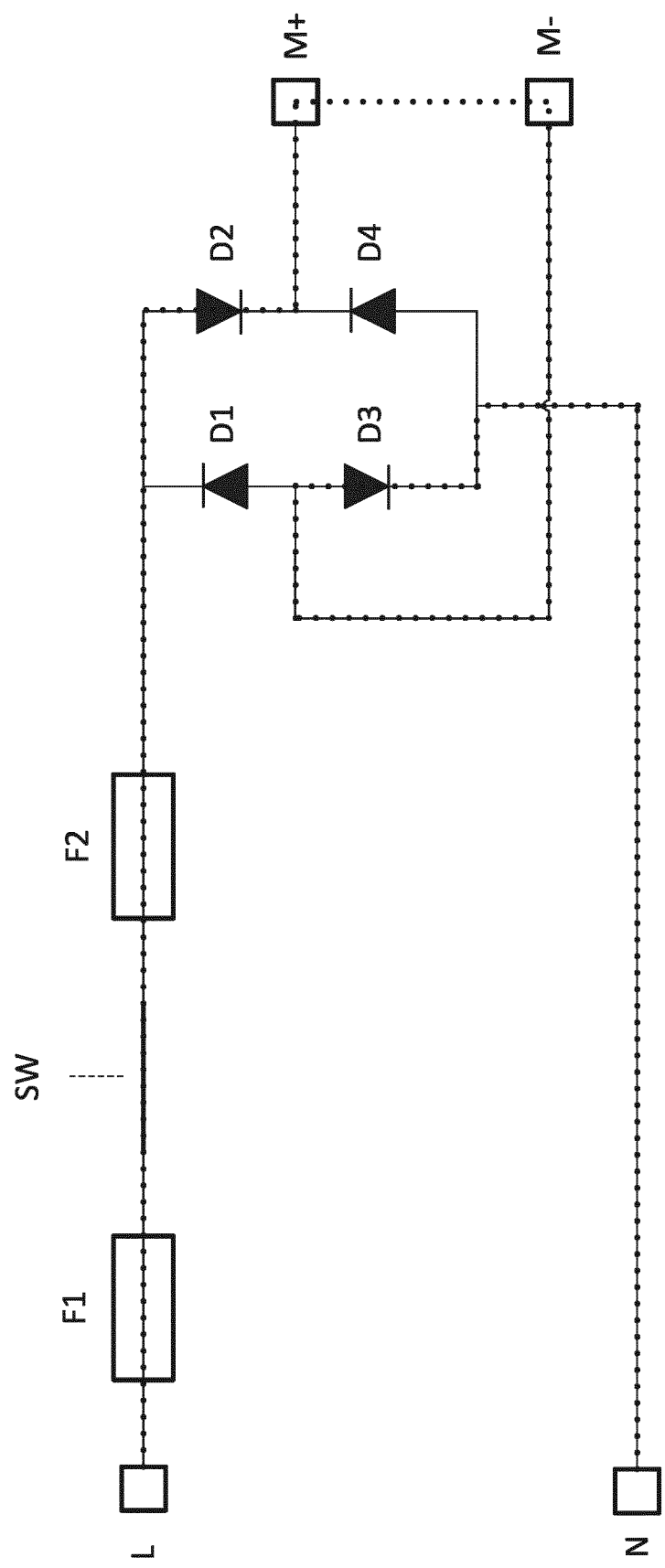
FIG. 3A is a circuit diagram illustrating current flow in a locked rotor scenario at the apparatus of FIG. 2.

Referring to FIG. 3A, when there is a locked rotor scenario at the apparatus, the current path through the circuit is represented by the dotted line in the circuit diagram between the terminals L and N. In more detail, the current passes through the motor unit via the terminals M+ and M− as well as the second diode D2 and the third diode D3 of the rectifier unit. The current also passes through both the first fuse F1 and the second fuse F2, and also the switch SW between the two fuses. Since the second fuse F2 has a lower breaking capacity than the first fuse F1 as explained above, the second fuse F2 trips due to the increasing locked rotor current.

Figure 3B:
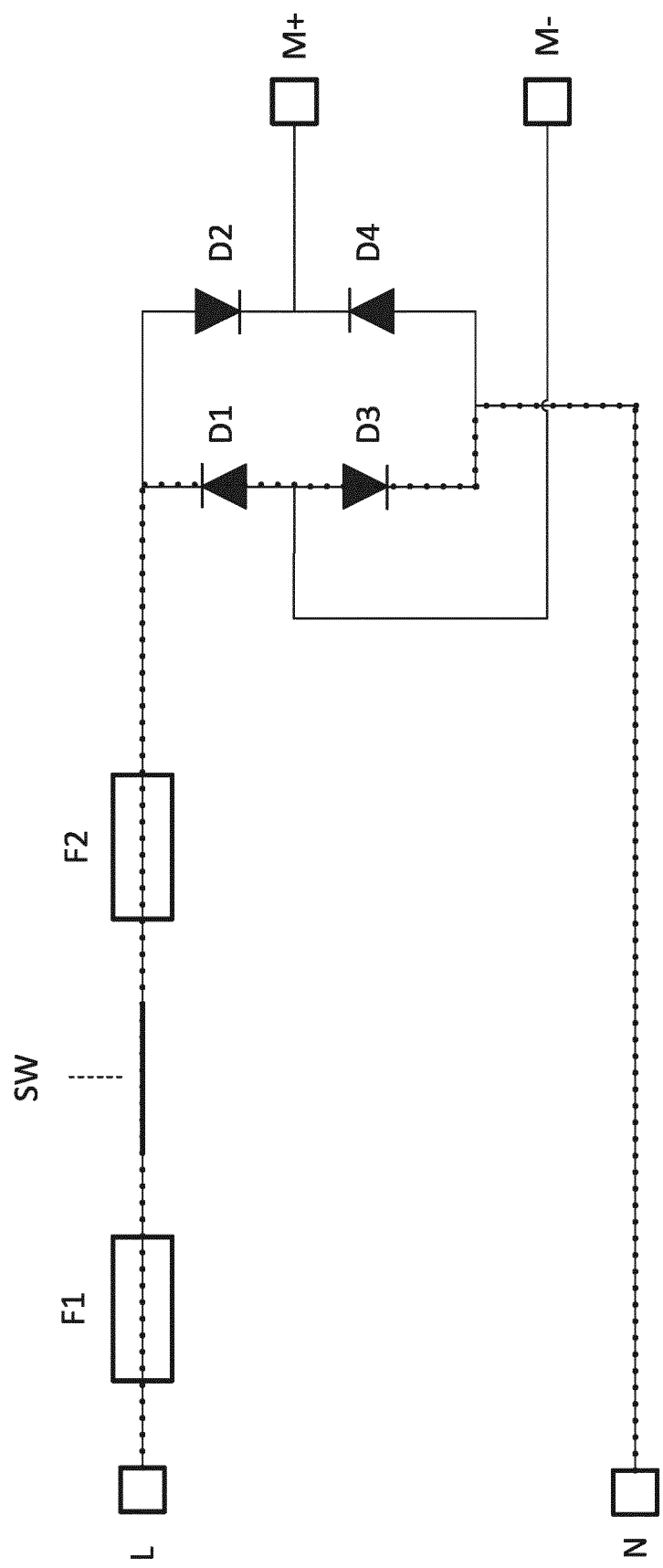
FIG. 3B is a circuit diagram illustrating current flow in a rectifier unit short circuit scenario at the apparatus of FIG. 2.

Referring to FIG. 3B, when the rectifier unit of the circuit is short-circuited, the current path through the circuit is represented by the dotted line in the circuit diagram between the terminals L and N. In more detail, in this scenario there is a short circuit in the rectifier unit, particularly the first diode D1. Instead of passing through the motor unit, the current passes through the rectifier unit via the first diode D1 and the third diode D3. The current also passes through both the first fuse F1 and the second fuse F2, and also the switched SW between the two fuses. Since in this case there is a high overload current, first fuse F1 trips before the second fuse F2. This is due to the time-current characteristics of the first fuse F1 being set in a way such that over a certain current threshold the first fuse F1 trips before the second fuse F2 and under the certain current threshold the first fuse F1 trips after the second fuse F2. In more detail, since the high overload current is over the certain current threshold associated with the time-current characteristics of the two fuses F1 and F2, the first fuse F1 trips before the second fuse F2. The current threshold associated with the time-current characteristics of the two fuses may be determined (or predetermined) based on the characteristics of the motor unit and the device at which the apparatus is implemented.

The operation of the circuit arrangement of the apparatus as illustrated in FIG. 2, FIG. 3A, and FIG. 3B, and in particular the time-current characteristics of the first fuse F1 and the second fuse F2, is explained in more detail with reference to FIG. 4.

Figure 4:
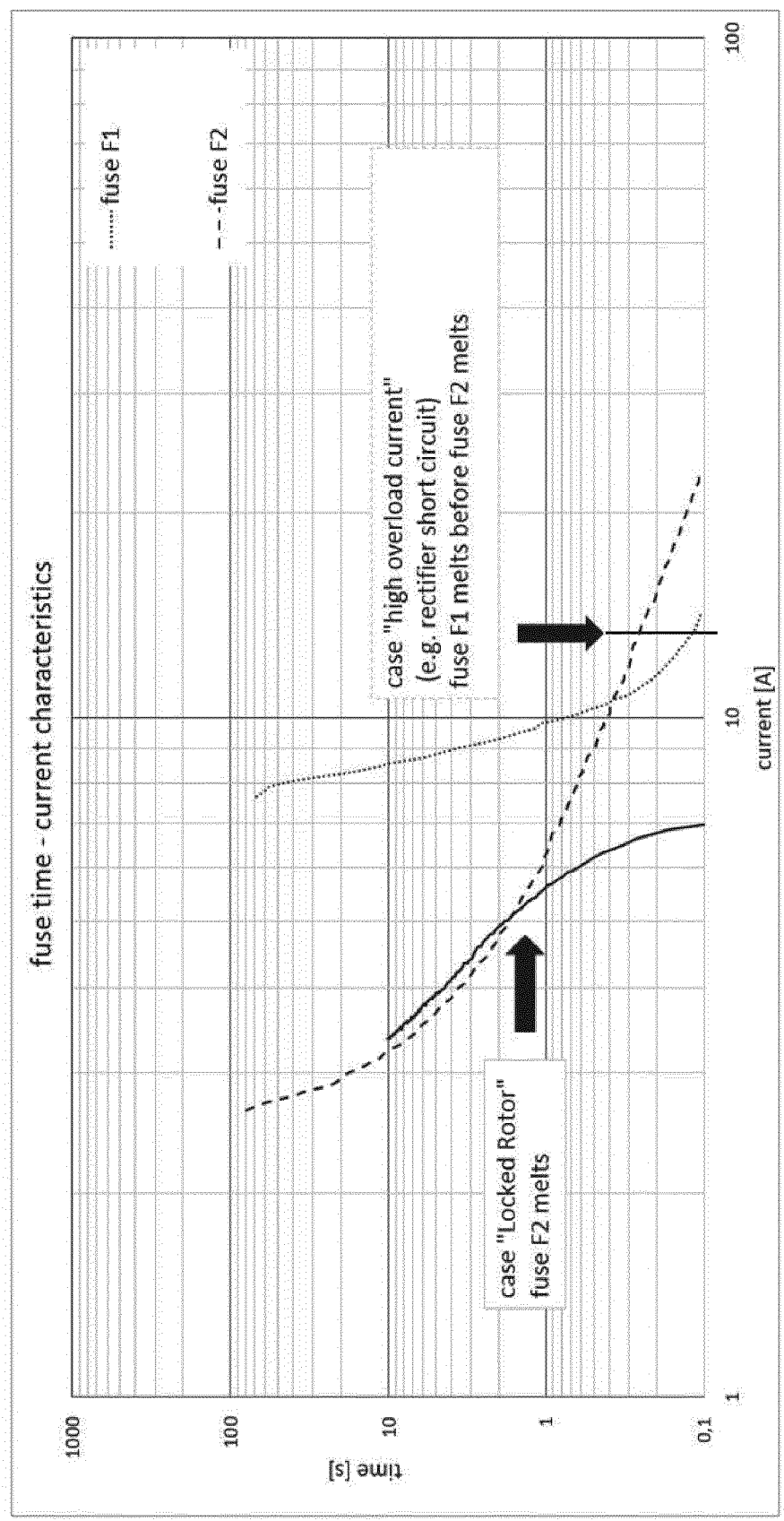
FIG. 4 is a graph of time against current for the first fuse and the second fuse in an apparatus for providing electrical protection, according to another embodiment.

FIG. 4 is a graph of time against current for the first fuse and the second fuse in an apparatus for providing electrical protection, according to another embodiment. For the purpose of illustration, the graph of FIG. 4 will be explained with reference to the components in the circuit represented by the diagrams in FIG. 2, FIG. 3A, and FIG. 3B.

The time-current characteristics of the first fuse F1, i.e. the first set of time-current characteristics, and the time-current characteristics of the second fuse F2, i.e. the second set of time-current characteristics, are respectively represented by different styles of dotted lines in the graphs and labelled in the legend of the graph as "fuse F1" and "fuse F2". The current variation in the circuit in the two different scenarios represented by FIG. 3A and FIG. 3B are respectively represented by solid lines and labelled (with arrows) as 'case "Locked Rotor"' and 'case "high overload current"' (e.g. when there is a rectifier unit short circuit) in the graph. "High overload current" means the situation when short circuit happens, for example, the current flows in the circuit when a rectifier unit short-circuit happens. Referring to FIG. 3B, this is a typical case for the "high overload current" situation.

Referring to the solid line representing the current variation in the circuit in the scenario of 'case "Locked Rotor"', during t=0.1 to t=10 the current starts off at a value of 8 A and drops off to around 3.5 A, and during this time solid line representing the current variation in the circuit intersects with the dotted line representing the time-current characteristics of the second fuse F2. As labelled with an arrow in the graph of FIG. 4, at the point of intersection of these two lines the second fuse F2 trips and starts melting. As the current variation in this scenario is always at a value lower than the breaking capacity of the first fuse F1 (i.e. no intersection of the solid line representing the current variation with the dotted line representing the time-current characteristics of the first fuse F1), the first fuse F1 is not affected in the "locked rotor" case in at least some embodiments of the disclosure.

Referring to the solid line representing the current variation in the circuit in the scenario of 'case "high overload current"', during t=0.1 s to t=0.4 s the current remains at the same high value around 13-15 A, and during this time the solid line representing the current variation in the circuit intersects with the dotted line representing the time-current characteristics of the first fuse F1 during the period between t=0.1 s and t=0.2 s. As labelled with an arrow in the graph of FIG. 4, at the point of intersection of these two lines the first fuse F1 trips and starts melting.

It is also noted that the solid line representing the current variation in the circuit also intersects with the dotted line representing the time-current characteristics of the second fuse F2 around t=0.4 s. However, in an implementation where the first fuse F1 and the second fuse F2 are connected in series, the first fuse F1 will trip and melt to interrupt the current flow before the second fuse F2 is affected when the circuit is at a high current fault condition. For example, as shown in the graph the first fuse F1 will trip around t=0.1 s to t=0.2 s while the second fuse F2 will trip (provided that current is still flowing) around t=0.4 s. As the current will be interrupted once the first fuse F1 trips, the second fuse F2 will remain unaffected in the scenario of a high current fault condition.

There is thus provided an improved apparatus for providing electrical protection, which overcomes the existing problems.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

We claim:

1. An apparatus for providing electrical protection at a device comprising a motor unit, the apparatus comprising:
   a first fuse connected to the motor unit, the first fuse having a first breaking capacity, a first set of time-current characteristics, and a first rating;
   a second fuse connected to the first fuse and the motor unit, the second fuse having a second breaking capacity, a second set of time-current characteristics, and a second rating, wherein the second set of time-current characteristics is different from the first set of time-current characteristics and the second rating is different from the first rating; and a switch, wherein the switch is connected in series with both the first fuse and the second fuse, wherein the first fuse and the second fuse are connected in series, wherein a value of the first breaking capacity of the first fuse is set such that at a high overload current fault condition, the first fuse acts to interrupt current before the second fuse, and wherein a value of the second set of time-current characteristics of the second fuse is set such that at a locked rotor condition of the motor unit, the second fuse acts to interrupt current before the motor unit reaches a maximum winding temperature.

2. The apparatus of claim 1, wherein the second rating is lower than the first rating.

3. The apparatus of claim 1, wherein the second breaking capacity is lower than the first breaking capacity.

4. The apparatus of claim 1, wherein the first breaking capacity is in the range between 1200 A and 1800 A, and the second breaking capacity is in the range between 25 A to 45 A.

5. The apparatus of claim 1, further comprising a rectifier unit connected to the motor unit, the rectifier unit being configured to provide rectified voltage to the motor unit.

6. A device comprising the apparatus of claim 1, the device further comprising the motor unit.

7. The device of claim 6, wherein the device is one of: an electric blender, an electric chopper, an electric juicer, and an electric food processor.

\* \* \* \* \*